(12) United States Patent
Nahum et al.

(10) Patent No.: US 6,487,787 B1
(45) Date of Patent: Dec. 3, 2002

(54) SYSTEM AND METHOD FOR DETERMINATION OF ERROR PARAMETERS FOR PERFORMING SELF-CALIBRATION AND OTHER FUNCTIONS WITHOUT AN EXTERNAL POSITION REFERENCE IN A TRANSDUCER

(75) Inventors: Michael Nahum, Kirkland, WA (US); Patrick H. Mawet, Snohomish, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 09/921,727

(22) Filed: Aug. 3, 2001

(51) Int. Cl.$^7$ ................................................. G01B 7/14
(52) U.S. Cl. ........................................... 33/706; 33/702
(58) Field of Search .......................... 33/701, 702, 706, 33/707, 708

(56) References Cited

U.S. PATENT DOCUMENTS

| | | | |
|---|---|---|---|
| 4,008,455 A | | 2/1977 | Pedersen |
| 4,761,608 A | | 8/1988 | Franklin et al. |
| 4,991,125 A | * | 2/1991 | Ichikawa ..................... 33/707 |
| 5,007,177 A | | 4/1991 | Rieder et al. |
| 5,053,713 A | | 10/1991 | Henoch |
| 5,260,769 A | * | 11/1993 | Ieki et al. ..................... 33/707 |
| 5,333,390 A | | 8/1994 | Petterson et al. |
| 5,386,642 A | | 2/1995 | Spies et al. |
| 5,408,758 A | * | 4/1995 | Mizutani et al. .............. 33/503 |
| 5,488,782 A | | 2/1996 | Ochiai |
| 5,535,142 A | * | 7/1996 | Mehnert et al. .............. 33/708 |
| 5,689,203 A | | 11/1997 | Geist |
| 5,742,921 A | | 4/1998 | Oo et al. |
| 5,798,640 A | | 8/1998 | Gier et al. |
| 5,861,754 A | | 1/1999 | Ueno et al. |
| 5,901,458 A | | 5/1999 | Andermo et al. |
| 5,924,214 A | | 7/1999 | Boege et al. |
| 5,935,070 A | | 8/1999 | Dolazza et al. |
| 5,956,659 A | * | 9/1999 | Spies et al. ................... 33/706 |
| 6,029,363 A | | 2/2000 | Masreliez et al. |
| 6,049,204 A | | 4/2000 | Andermo et al. |

* cited by examiner

*Primary Examiner*—G. Bradley Bennett
(74) *Attorney, Agent, or Firm*—Christensen O'Connor Johnson Kindness PLLC

(57) ABSTRACT

A system and method for determination of error parameters for performing self-calibration and other functions in a transducer. The method utilizes the minimum and maximum values of the output signals of the transducer. To obtain these values, the output signals are measured at various times according to the sample timing, as the read head is scanned relative to the scale. The offset for each phase is determined to be equal to the average between the maximum and minimum voltages. The signal amplitudes are equal to the difference between the maximum and the minimum voltages, divided by two. By comparing the amplitude for each phase, the amplitude mismatch is found. The phase relation error may be determined by first removing the amplitude mismatch and the offset errors from each phase, and then comparing the relative amplitudes of the two signals at a given point in relation to what they ought to be with no phase relation error. The described method provides a fast calibration method which requires a minimum amount of data, and which can be automatically run in a background mode without inhibiting normal transducer operation.

35 Claims, 12 Drawing Sheets

SYSTEM AND METHOD FOR DETERMINATION OF ERROR PARAMETERS FOR PERFORMING SELF-CALIBRATION AND OTHER FUNCTIONS WITHOUT AN EXTERNAL POSITION REFERENCE IN A TRANSDUCER

FIELD OF THE INVENTION

This invention relates to position transducers, and more specifically, to a system and method for determination of error parameters for performing self-calibration and other functions in a position transducer system.

BACKGROUND OF THE INVENTION

Various movement or position transducers for sensing linear, rotary or angular movement are currently available. These transducers are generally based on either optical systems, magnetic scales, inductive transducers, or capacitive transducers.

In general, a transducer may comprise a read head and a scale. In an example of a 2-phase system, the transducer outputs two signals S1 and S2 that vary sinusoidally as a function of the position of the read head relative to the scale along a measuring axis. In one common concept for transducers, the signals S1 and S2 are intended to be identical except for a quarter-wavelength phase difference between them. The transducer electronics use these two signals to derive the instantaneous position of the read head relative to the scale along the measuring axis.

Ideally, the signals $S_1$ and $S_2$ are perfect sinusoids with no DC offsets, have equal amplitudes, and are in exact quadrature (i.e., a quarter-wavelength out of phase relative to each other, also referred to as "orthogonal" herein). In practice, the signals $S_1$ and $S_2$ have small DC offsets, their amplitudes are not equal, and they have some orthogonality error. In addition $S_1$ and $S_2$ may have distorting spatial harmonic components. In addition, the transducer electronics can introduce additional errors such as offset, gain, and non-linearity errors.

In many practical transducers, the dominant sources of errors are offsets, and amplitude mismatches and phase errors between the phases. These errors are shown in the following equations for the case of a 2-phase system.

$$S_1 = C_1 + V_1 \sin\frac{2\pi}{\lambda}(x - \phi_1) \quad (1)$$

$$S_2 = C_2 + V_2 \cos\frac{2\pi}{\lambda}(x - \phi_2) \quad (2)$$

In the above equations, x is a position, and $\lambda$ is a wavelength to the transducer output. The terms $C_1$ and $C_2$ produce offset errors. The terms $V_1$ and $V_2$ (if $V_1 \neq V_2$) produce amplitude mismatch errors. The terms $\phi_1$ and $\phi_2$ (if $\phi_1 - \phi_2 \neq 0°$) produce phase mismatch errors, that is, phase relationship errors.

Alternatively, some transducers utilize a 3-phase system. The equations for a 3-phase system are shown below.

$$U_R = C_0 + A_0 \sin\frac{2\pi}{\lambda}(x - \phi_0) \quad (3)$$

$$U_S = C_0' + A_0' \sin\frac{2\pi}{\lambda}\left(x + \frac{\lambda}{3} - \phi_0'\right) \quad (4)$$

$$U_T = C_0'' + A_0'' \sin\frac{2\pi}{\lambda}\left(x - \frac{\lambda}{3} - \phi_0''\right) \quad (5)$$

In the above equations, the terms $C_0$, $C_0'$, and $C_0''$ produce offset errors. The terms $A_0$, $A_0'$, and $A_0''$ (if they are not identical) produce amplitude mismatch errors. The terms $\phi_0$, $\phi_0'$, and $\phi_0''$ (if not all equal) produce phase mismatch errors.

One method for addressing errors such as those shown above is to calibrate the transducer. Calibrating the transducer and compensating for these errors requires determining or comparing the DC signal offsets, the amplitudes of the fundamental signals, the phase error between the fundamental signals, and insuring that they are adjusted or compensated to be equal. For further error compensation, the amplitudes of the harmonic components must also be considered.

One commonly used prior transducer calibration method is the "Lissajous" method. The Lissajous method typically comprises inputting two nominally orthogonal read head signals to an oscilloscope, to drive the vertical and horizontal axis of the oscilloscope. The read head is continually scanned relative to the scale to generate changing signals. The oscilloscope display is observed, and the read head is physically and electronically adjusted until the display indicates a "perfect" circle, centered at zero on both axes. Under this condition, the amplitude, orthogonality, and offset of the two signals are properly adjusted.

The Lissajous method assumes that the two signals are both perfect sinusoids. Typically, there is no adjustment for harmonic errors which can distort the circle, as it is hoped that these are made insignificant by fixed features of the transducer design and assembly. The Lissajous method is well known to those skilled in the art, and has been performed by sampling the two signals with computer-based data acquisition equipment. However, to use this method in the case of a 3-phase system, the signals must generally to be converted to orthogonal signals before processing. Many three-phase systems either lack such signals, or access to such signals is either inconvenient or costly, making the Lissajous method inappropriate for many 3-phase transducer systems and products.

Alternatively, it has also been common to accept any transducer errors due to imperfect amplitudes, orthogonality, harmonics, and offsets, and to use an external reference, such as a laser interferometer, to accurately correct position errors from the read head at the system level, at predetermined calibration positions relative to the scale.

Position transducers typically require initial factory calibration, and periodic calibration or certification thereafter. In both cases, there is a cost for the associated equipment and labor. When the transducer is located in a remote location, it is difficult to set up the external data acquisition equipment and/or accurate external reference required for calibration. As a result, the transducer often has to be transported to another site or shipped back to the factory for calibration. This results in long downtime and increased costs.

Even in cases where the transducer does not have to be transported for calibration, the special tools and increased time required to set up the external display and/or reference result in increased costs and downtime. Thus, calibration and recalibration is often minimized or avoided, in practice.

Since most practical position transducers are sensitive to variations during production, installation, and use, measurement errors normally increase in the absence of calibration, and in the periods between recalibration.

One example of a self-calibration method for an inductive position sensor is illustrated in U.S. Pat. No. 5,742,921. However, the method of the '921 patent is closely tied to the operation of an associated motor, teaches positioning the transducer in order to acquire the desired data, and emphasizes calibration based on a signal range which is of little or no importance in certain implementations.

Another exemplary self-calibrating position transducer system that better-addresses some of the issues outlined above is illustrated in U.S. Pat. No. 6,029,363, which is commonly assigned and hereby incorporated by reference in its entirety. The method described in the '363 patent samples two orthogonal output signals of the transducer at a plurality of evenly spaced positions within the one scale period, using the transducer itself as a position reference. The method then determines calibration values for the DC signal offsets, the amplitudes and non-orthogonality of the fundamental signals, and the amplitudes of the signal harmonic components using Fourier analysis techniques. Finally, the method corrects the signals using the determined calibration values. In summary, the method of the '363 patent determines the error parameters by: (1) measuring the output voltages of the transducer as a function of a known position, and (2) analyzing the data using Fourier series techniques to derive the offset, amplitude, and phase mismatch parameters.

The method of the '363 patent is effective for addressing many of the calibration issues described above, including the ability to compensate spatial harmonic errors. However, the method also introduces inconvenient data acquisition complexity and other constraints which reduce the convenience of the method in many practical situations. The present invention is directed to an alternative method for determination of error parameters for performing self-calibration and other functions without an external position reference in a transducer.

SUMMARY OF THE INVENTION

Most prior art position transducer systems do not include any way to conveniently identify and correct the various errors described above, outside of a permanent factory calibration environment. Furthermore, prior art methods have resulted in system error corrections that are fixed at the time of calibration, with no convenient way to adjust the corrections for subsequent alignment changes or aging of the transducer components. The present invention is directed to a system and method for determination of error parameters for performing self-calibration and other functions without an external position reference in a transducer. In various embodiments, the systems and methods of this invention uses a min-max method that involves measuring the transducer output signals as a function of time and does not require knowledge or recording of known positions. Thus, special tools or instruments are not required to calibrate the position transducer. In addition, the method is simple and fast enough that calibration/re-calibration or a related self-test operation may be performed continuously as a background task while the position transducer is operating. Thus, the system can keep the position transducer continually calibrated without interfering with the transducer's normal operation.

In one embodiment, the method of this invention samples the output signals at a relatively high rate. The read head is moved relative to the scale at a speed v, along with an initial acceleration a. It is not necessary to know either v or a, but it is preferred that they be lower than a predetermined maximum value. The scan may be continued over a distance of several wavelengths. In this manner, the output signals are measured at various times according to the sample timing (not particular or approximate positions, since initial position, velocity and acceleration are not typically determined), as the read head is scanned relative to the scale. To find the offset for each phase, the minimum and maximum voltages for that phase are found. If a scan over several wavelengths is used, average values are computed. The offset for each phase is equal to the average between the maximum and minimum voltages. The signal amplitudes are equal to the difference between the maximum and minimum voltages, divided by 2. By comparing the amplitude for each phase, the amplitude mismatch is found. The phase mismatch error is found by first removing the amplitude mismatch and offset errors from each phase, and then comparing the relative amplitudes of the two signals at a given point in relation to what they ought to be with no phase relation error.

By utilizing the minimum and maximum voltages of a given phase to perform the calibration method, the method has a number of advantages. One advantage is that the calculation method is straightforward from the data, and does not require any iteration or data adjustment. In addition, less data needs to be saved in a memory because the method only requires the data near the peaks of the output waveform. Furthermore, unlike certain prior art methods which are required to be performed on two signals, the method can be applied to any number of signals from any number of phases. In addition, since only the peak values of the output function are utilized, the method is not so sensitive to unexpected distortions or spatial harmonics of the expected output/position transfer function.

The described method provides a fast calibration method which requires a minimum amount of data, and which can be automatically run in a background mode without inhibiting normal transducer operation. One embodiment where such a method has a particular utility is in inductive transducers. In particular, in many practical inductive transducers, offset and amplitude errors are the dominant errors. Furthermore, inductive transducers are increasingly used in low-power handheld instruments with limited computation speed and memory. Thus, the systems and methods of this invention are extremely well-matched for application to such systems.

Regarding another use of the invention, it should be appreciated that under significant contamination conditions, the signals of most other types of transducers degrade catastrophically, preventing erroneous use. However, inductive transducers are inherently designed to be able to continue functioning in the presence of contaminants. Thus, users may become complacent regarding the contamination of such transducers. In such cases, the self-calibration operations described herein are capable of detecting subtle changes in the operating signals of the inductive transducers, and they therefore provide a basis for alerting the user that contamination, or some other subtle accuracy problem, may be present. Of course, it should be appreciated that the systems and methods of this invention have this same utility in other types of transducers, when the contamination subtly degrades their signals, but is not serious enough to cause the previously described catastrophic signal degradations. Thus, the systems and methods of this invention are particularly important for identifying and correcting subtle operating problems in a wide variety of transducer systems with spatially periodic signals.

Another implementation where the systems and methods of this invention are particularly advantageous is one where increased accuracy is required. For example, it may be desired that a relatively low cost linear scale transducer produce measurements with 0.5 micron accuracy, for which calibration is essential.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
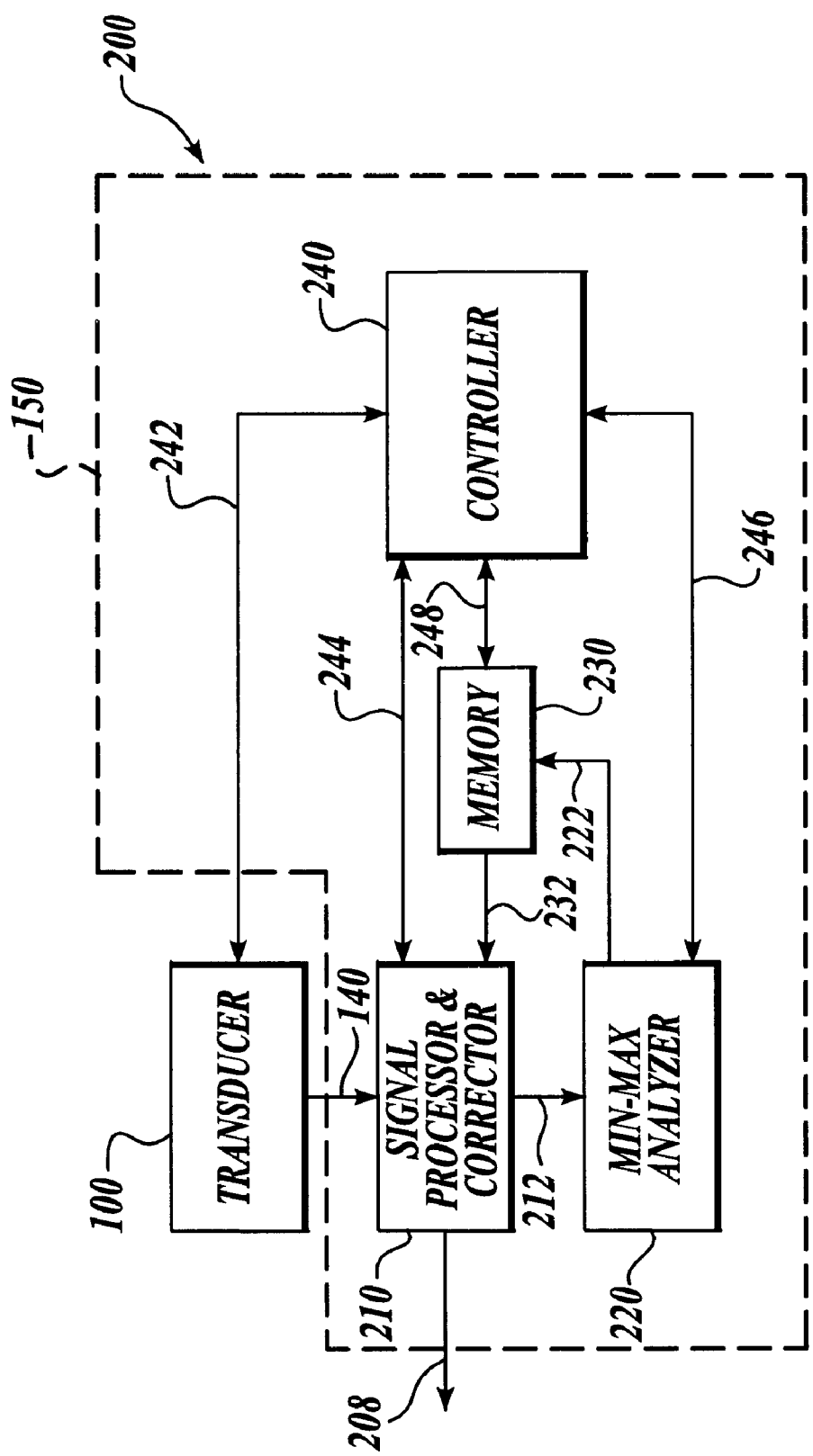
FIG. 1 is a block diagram of a transducer system with min-max processing circuitry in accordance with the present invention.

FIG. 1 is a block diagram of a transducer system 200 formed in accordance with the present invention. The transducer system 200 includes a transducer 100, and signal processing and control electronics 150. The signal processing and control electronics 150 includes a signal processor and corrector 210, a min-max analyzer 220, a memory 230, and a controller 240. The transducer 100 typically includes a read head and a scale (not shown).

The transducer 100 generates transducer signals and outputs the signals to the signal processor and corrector 210 over a signal line 140. The signal processor and corrector 210 receives signal correction values from the memory 230 over a signal line 232. It will be understood that signal correction values may comprise any type of signals or values that may be used in the process for improving the accuracy of the system, including calibration values or others. In various exemplary embodiments of a measurement mode, the signal processor and corrector 210 uses the signal correction values to correct the transducer signals from the transducer 100, computes a position from the corrected signals and outputs a position information signal to a display or host processor over a signal line 208. In particular, the position information signal can be a position signal indicating the relative position between the read head and the scale. Alternatively, the signal processor and corrector 210 uses the signal correction values to correct the transducer signals from the transducer 100, and sends the corrected transducer signals to a host processor for position calculation and/or further processing. In yet another exemplary embodiment, the signal processor and corrector 210 inputs 3-phase transducer signals from the transducer 100, processes the signals into quadrature signals by known methods, applies appropriate signal correction values to correct the processed quadrature signals, and either outputs the corrected processed quadrature signals or a position signal based on the quadrature signals.

In one exemplary embodiment of a calibrating mode of operation, the signal processor and corrector 210 inputs transducer signals from the transducer 100, processes the signals, without correcting them, into a form expected by the min-max analyzer 220, and outputs them to the min-max analyzer 220 over a signal line 212. In various exemplary embodiments, the signal processor and corrector 210 inputs and outputs the transducer signals in a comparable form. Alternatively, the signal processor and corrector 210 inputs 3-phase transducer signals from the transducer 100, processes the signal values into quadrature signal values by known methods, and outputs the processed quadrature signal values.

In another exemplary embodiment of a calibrating mode of operation, the signal processor and corrector 210 inputs transducer signals from the transducer 100, processes the signals, including correcting them, into a form expected by the min-max analyzer 220, and outputs them to the min-max analyzer 220 over a signal line 212.

The min-max analyzer 220 determines new signal correction values, and sends the new signal correction values to the memory 230 over a signal line 222. Depending on the form of the signals received from the signal processor and corrector 210, and the particular implementation according to the systems and methods of this invention, the new signal correction values may be either corrections to the existing signal correction values, or replacement signal correction values.

The controller 240 outputs drive signals to the transducer 100 over the signal line 242 and control signals over the signal lines 244, 246 and 248 to the signal processor and corrector 210, the min-max analyzer 220 and the memory 230, respectively.

The controller 240, the min-max analyzer 220 and the signal processor and corrector 210 are preferably implemented on a single, programmed, general purpose microprocessor or microcontroller and peripheral integrated circuit elements. Thus, in various embodiments, at least the controller 240, the min-max analyzer 220 and the signal processor and corrector 210 may be physically indistinguishable. Furthermore, while FIG. 1 shows the signal lines 212, 222, and 232 as independent signal lines, these signal lines can be replaced with a single data bus. Similarly, the control signal lines 244, 246 and 248 can be replaced with a single control bus. Finally, all these signal lines can be replaced with a single data/control bus.

The controller 240, the min-max analyzer 220 and the signal processor and corrector 210 can also be implemented, collectively or individually, by an ASIC or other integrated circuit, a hardwired electronic or logic circuit such as a discrete element circuit, a programmable logic device such as a FPGA, PLD, PLA or PAL, or the like. In general, any device or set of devices on which a finite state machine capable of implementing the methods and the equations set forth below can be used to implement the controller 240, the min-max analyzer 220 and/or the signal processor and corrector 210. The memory 230 is preferably implemented using static or dynamic RAM. However, the memory 230 can also be implemented using flash memory or the like.

Furthermore, in one exemplary embodiment, the signal processing and control electronics 150 are compactly housed in the read head of the transducer 100. However, in various other embodiments, the transducer 100 is located remotely from the majority of the signal processing and control electronics 150, which may be located, for example in a remote housing proximate to a host system controller, or a position display. In such embodiments, the read head houses only those portions of the signal processing and control electronics 150 which are necessary to insure signal integrity over the signal lines 140 and 242. In various exemplary embodiments, the portions may include a transducer drive circuit, sample and hold circuitry, signal conditioning circuitry, an ADC, and a signal and control interface circuit connected to the signal lines 140 and 242. In yet other embodiments not shown, the signal processing and control electronics may omit one or more elements, or else such elements may be remotely located and yet connectable to the remaining signal processing and control elements by conventional signal wires or wireless means. For example, the min-max analyzer 220 may be located remotely from the other elements of the signal processing and control electronics 150, or be part of a separate system, such as host system controller, or a position display. These and other embodiments that are usable according to the systems and methods of this invention will be apparent to one skilled in the art.

One particular type of system in which the present invention may be utilized is reduced offset inductive transducers. An exemplary embodiment of a reduced offset transducer is shown in U.S. Pat. No. 5,901,458, which is commonly assigned and hereby incorporated by reference in its entirety. Another application in which the present invention is particularly applicable is a linear scale. An exemplary embodiment of a linear scale is shown in U.S. Pat. No. 6,049,204, which is commonly assigned and hereby incorporated by reference in its entirety. Linear scales may achieve an accuracy as precise as 0.5 microns or better, and precise and frequent calibration is useful for achieving and maintaining such accuracy.

Figure 2:
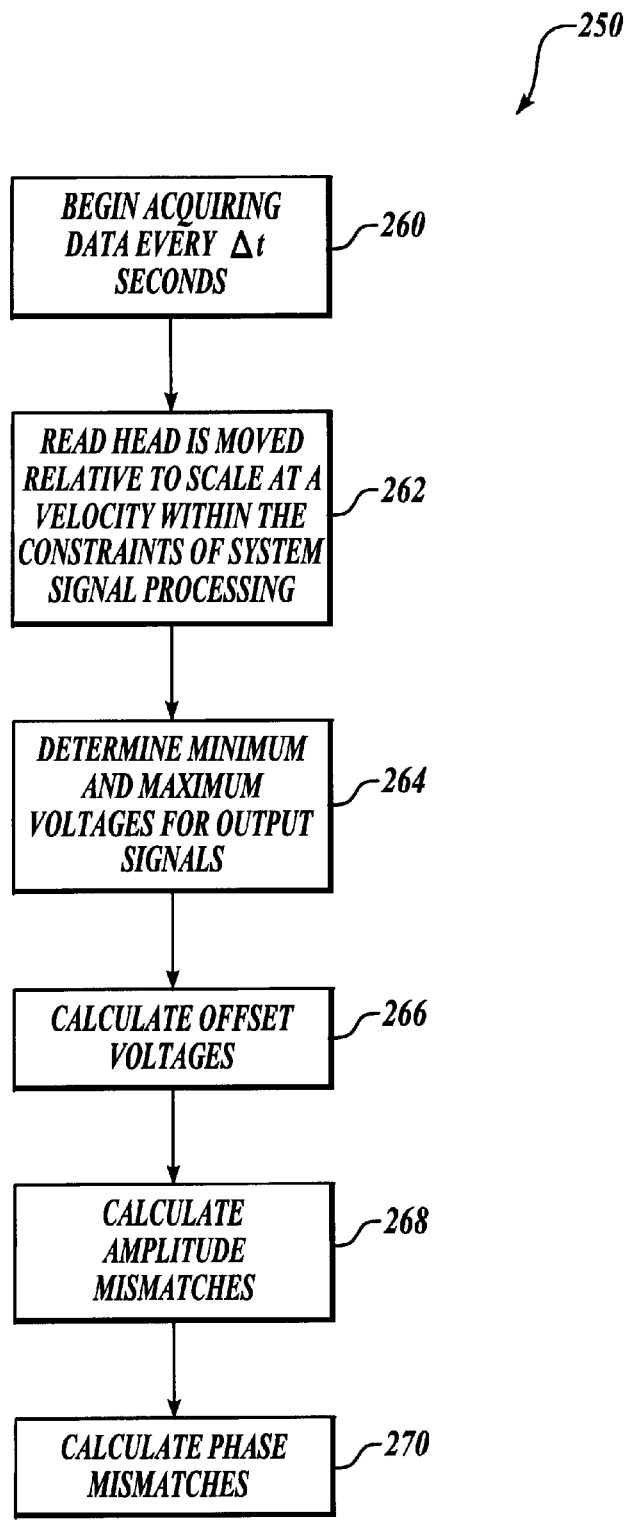
FIG. 2 is a flow diagram illustrating one embodiment of the method of the present invention.

FIG. 2 is a flow diagram illustrating one embodiment of the method of the present invention. As shown, the min-max routine 250 begins acquiring data every $\Delta t$ seconds at a block 260. The data that is stored includes at least the data in the vicinity of signal peaks, that is, the positive and negative extreme values of the signals. In a preferred embodiment, $\Delta t$ is determined in accordance with the desired principle that the electronics of the system continuously acquire the data as fast as possible, within the limits of the desired power efficiency. At a block 262 the read head is moved relative to the scale at a speed v and an initial acceleration a. In accordance with the method, it is not necessary to know the values of either v or a, but they do need to be lower than predetermined maximum values consistent with the constraints of the signal processing system, as will be described in more detail below. In various exemplary embodiments, the operations of blocks 260 and 262 may also be reversed or combined.

With regard to the acquisition of data points at blocks 260 and 262, it is preferred that the data points be spaced sufficiently close to one another, so that the measured maxima and minima values will not differ substantially from their true values. As an example, for a transducer with a wavelength of 3 mm the inventors have compared compensation results for data points spaced by $\Delta x$=60 um, $\Delta x$=45 um, $\Delta x$=34.5 um, and $\Delta x$=22.5 um. In all cases the compensated error results according to the systems and methods of this invention were very good. For example, all error results were at the level where the harmonic error content and system noise were approximately as significant as the remaining offset and amplitude error contributions. More generally, regarding a desired data spacing corresponding to a maximum allowed peak detection error determined by experiment or analysis, if the data is acquired by electronics every $\Delta t$ seconds, then the following equation places a limit on the acceleration a, the time t that the acceleration is applied, and the speed v.

$$\Delta x = at\Delta t + v\Delta t \tag{6}$$

As a further example, for one typical type of commercially available low-power low-speed inductive transducer with a 5 millimeter wavelength, a reasonable $\Delta t$ value is 1.5 milliseconds, and the maximum speed for a good level of signal correction would be about 0.1 m/s and any reasonable acceleration could be used. As a specific example, this would mean that an entire 0.5 m scale could be scanned in about five seconds (although in practice a shorter calibration distance/time corresponding to a portion of the scale, is sufficient).

An additional consideration is to verify that the noise per data point is sufficiently low so that the signal samples in the vicinity of the peaks are sufficiently accurate. In accordance with one preferred embodiment, in order to achieve a sufficient signal-to-noise ratio, a distance of several wavelengths of the transducer is scanned. If the noise is high, it may be desired to acquire and average multiple signal samples in the vicinity of the signal peaks by repeated scale scans, longer scans, or slower motion. Longer scans have the advantage of reducing the effect of possible local scale imperfections on the calibration.

It should be noted that for various embodiments in accordance with the above-described operation, the output signals of the transducer are sampled or measured at various times according to the sample timing as the read head is scanned relative to the scale. Such signals will be described in more detail below with reference to FIGS. 3–7. It is notable in such embodiments that the signals are not acquired as a function of position. Thus, these embodiments provide a number of distinct advantages over prior art methods, in that an external a position reference is not needed, internal position calculations are not needed, accurate or approximate positioning is not needed, an inherent sample rate of the system can be used to acquire data, and relatively few data points need to be maintained and processed. Thus, the system is faster and more power efficient than previous methods, and may furthermore be implemented in systems where the processing electronics and power available are minimal.

However, it should be appreciated with regard to the operations of blocks 260 and 262, that in systems where the signal processing capability is sufficiently fast and/or it is practical to control the sample timing and/or motion of the system, other data acquisition schemes may be used. For example, a sufficiently fast processor may monitor the signals of the system, detect that the signals exceed a threshold indicative of the vicinity of a signal peak, and acquire only such signals. Further, with sufficient processing speed, a processor may compare successive signal samples in real time, and retain only the peak values for processing according to the operations described below. All such embodiments will retain some or all of the previously-cited distinct advantages of this invention. Further data acquisition variations which acquire at least the peak signal data and are usable according to the systems and methods of this invention will be apparent to one skilled in the art, and fall within the scope of this invention.

At a block 264, the routine determines the peak signals for the output signals, that is, the minimum and maximum voltages $V_{min}$ and $V_{max}$, from the stored data according to well-known methods. For example, with regard to the determination of $V_{min}$ and $V_{max}$, if a scan over several wavelengths is used, average values are computed.

Once the minimum and maximum voltages for a phase are determined, at block 266, the routine calculates the offset voltages for the phases of the transducer. The offset for each phase signal can be determined using the following equation.

$$\frac{V_{max} + V_{min}}{2} \quad (7)$$

At a block 268, the amplitude mismatches are calculated. The signal amplitudes for each phase signal can be determined using the following equation.

$$\frac{V_{max} - V_{min}}{2} \quad (8)$$

Once the amplitudes for each phase are determined, by comparing them the amplitude mismatches can be found.

At a block 270, in various exemplary embodiments, the phase mismatches, that is the signal deviations from the expected phase relation, are calculated. The phase mismatch errors are found by first removing the amplitude mismatch and offset errors from each phase signal, and then comparing the relative values of the signals at a given position point in relation to what they ought to be with no phase relation error, based on the expected signal shape. It should be appreciated that in embodiments where a phase mismatch is determined, signal data from all phases must be acquired for at least one shared position point. Thus, in various previously described embodiments where only peak data is stored, such embodiments must also include a provision for retaining or acquiring this "extra" data. It should be noted that the inventors have found that in some transducers, and especially transducers having wavelengths on the order of a millimeter or more, phase mismatch errors are negligible compared to other systems errors. Thus, in various embodiments, the operations of block 270 are optional.

Figure 3:
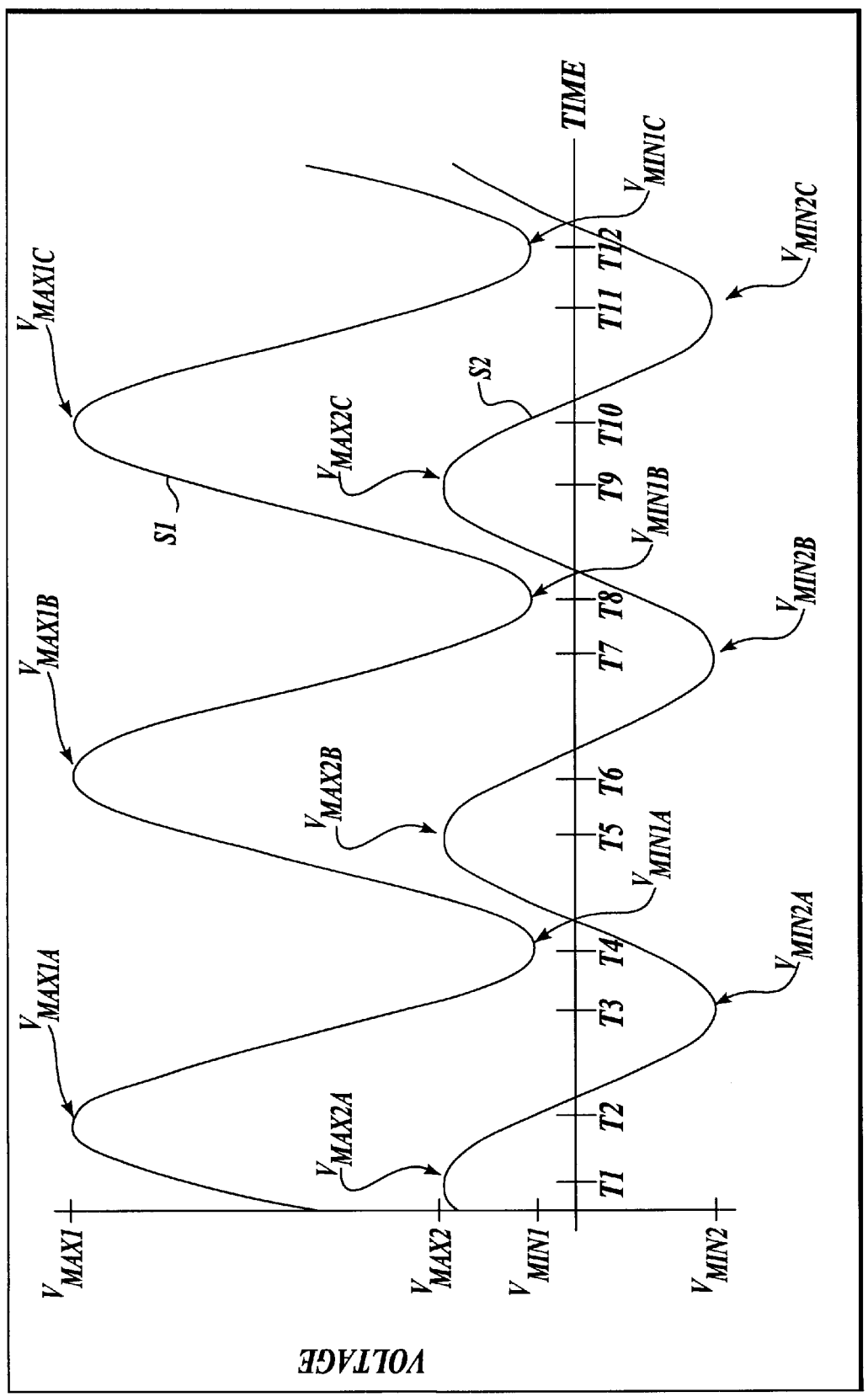
FIG. 3 is a time diagram of the output signals of a 2-phase system, where one of the signals has both an offset and a larger amplitude, and illustrating the method of the present invention.

FIG. 3 shows an exemplary time diagram of two output signals of a 2-phase transducer, which in this case is moving at an approximately constant velocity. The disparity of the two signals is exaggerated for clarity. As illustrated, the two output signals S1 and S2 cycle through three sets of minimum and maximum values. As illustrated, at time T1, the signal S2 reaches a maximum value $V_{max2a}$. Once the maximum value is identified by the system, it is stored as a maximum value for signal S2. At time T2, the signal S1 reaches a maximum value $V_{max1a}$. Once this maximum value is identified by the system, it is stored as a maximum value for signal S1. At time T3, the signal S2 reaches a minimum value $V_{min2a}$. Once this minimum value is identified by the system, it is stored as a minimum value for signal S2. At time T4, the signal S1 reaches a minimum value $V_{min1a}$. Once this minimum value is identified by the system, it is stored as a minimum value for signal S1. As illustrated in the example of FIG. 3, this process repeats for two more wavelengths, such that three signal samples are stored for each of the minimum and maximum values of each of the signals S1 and S2. Thus, for example, signal S1 will have three maximum values $V_{max1a}$, $V_{max1b}$, and $V_{max1c}$. To determine the overall stored value $V_{max1}$, the acquired data points can be averaged. Once the minimum and maximum values are determined for each of the phases, the offset, amplitude mismatch, and phase mismatch values can be determined in accordance with the methods and equations described above with reference to FIG. 2. It should be appreciated that in various other embodiments, if the transducer velocity were not approximately constant as in the example of FIG. 2, then the waveform would not longer appear temporally periodic along the horizontal axis. However, in such as case, so long as the time indicating marks T1–T12 are moved to remain in correspondence to their respective signal peaks, that is, the signal maxima and minima, the generality of the foregoing discussion will be unaffected.

Figure 4:
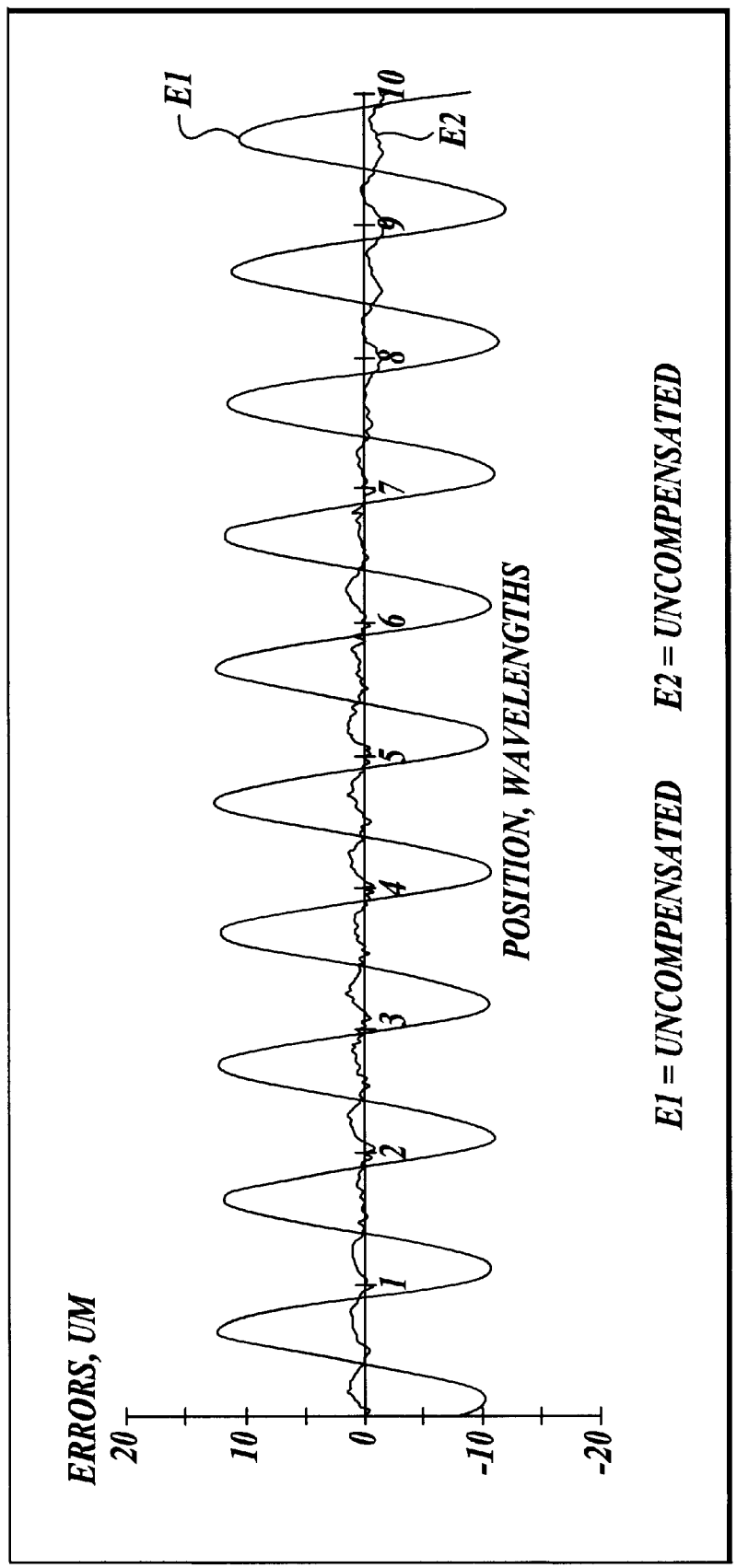
FIG. 4 is a position error diagram representative of a 2-phase system such as that of FIG. 3, where an error result produced by signal disparities from an actual transducer without compensation is compared to one for which compensation has been performed in accordance with the present invention.

FIG. 4 shows a position error diagram representative of a 2-phase system such as that of FIG. 3. FIG. 4 is based on transducer signal disparities provided by a typical actual transducer. An error signal E1 is shown, which represents the position error values produced in an experiment without utilizing the self calibration techniques of the present invention. In contrast, an error signal E2 is shown which illustrates the position error values that resulted in the experiment when the above-described self-calibration techniques were utilized. As can be seen, the signal E2 shows much lower error values than the signal E1, thus demonstrating that the methods of the present invention significantly reduce the measurement error values.

Figure 5A:
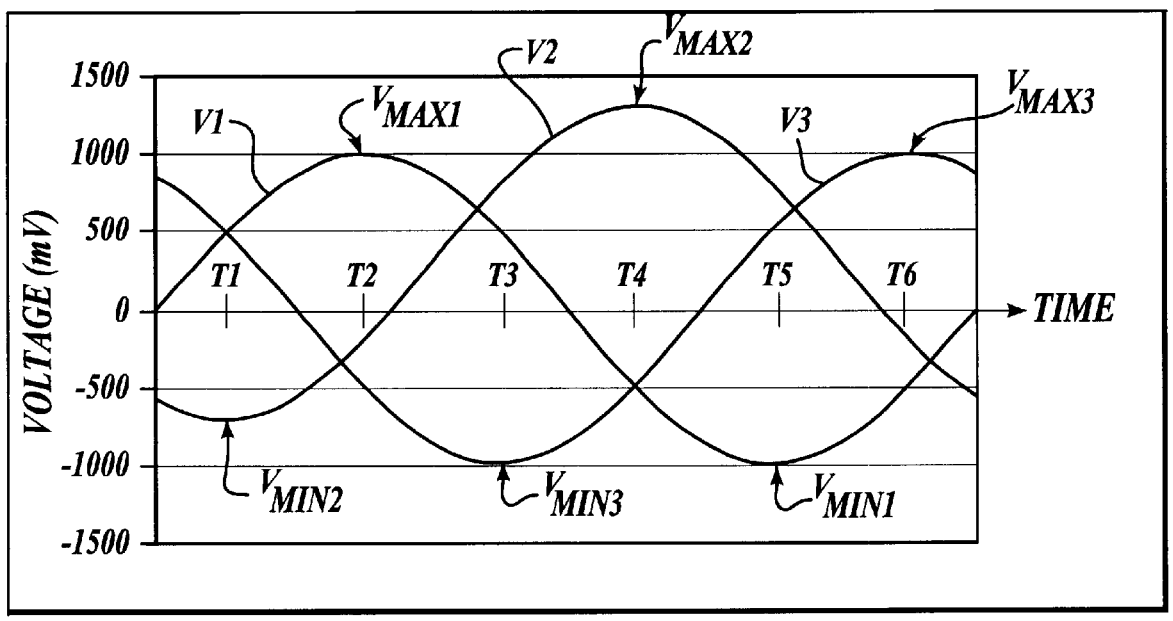
FIG. 5A is a time diagram of the output signals of a 3-phase transducer system, where one of the signals has an offset, and illustrating the method of the present invention.

FIGS. 5–7 illustrate various output signals from a 3-phase transducer system, which is again assumed to be moving at an approximately constant velocity. FIG. 5A shows three signals from a 3-phase transducer. As illustrated, the diagram spans one wavelength, and the signals are periodic, in that if the X axis were extended, the signals would repeat themselves. The three signals are designated as signals V1, V2, and V3.

With regard to the specific data points acquired by the system for the signals of FIG. 5A, at a time T1, the signal V2 is at a minimum value $V_{min2}$, which is at approximately –750 mV. Once this minimum value is identified by the system, it is stored as a minimum value for signal V2. At time T2, the signal V1 is at a maximum value $V_{max1}$, which is at approximately 1000 mV. Once this maximum value is identified by the system, it is stored as a maximum value for signal V1. Similarly, at time T3, the signal V3 is at a minimum value $V_{min3}$ of approximately −1000 mV, at time T4 the signal V2 is at a maximum value $V_{max2}$ of approximately 1250 mV, at time T5 the signal V1 is at a minimum value $V_{min1}$ of approximately −1000 mV, and at time T6 the signal V3 is at a maximum value $V_{max3}$ of approximately 1000 mV.

Using these values and the above equations, it can be determined that the signals V1 and V3 have no offset and no amplitude mismatch, and vary from 1000 mV to −1000 mV. However, the signal V2 is shown to have an offset of positive 250 mV, in accordance with its maximum peak at 1250 mV and its minimum peak at −750 mV.

Figure 5B:
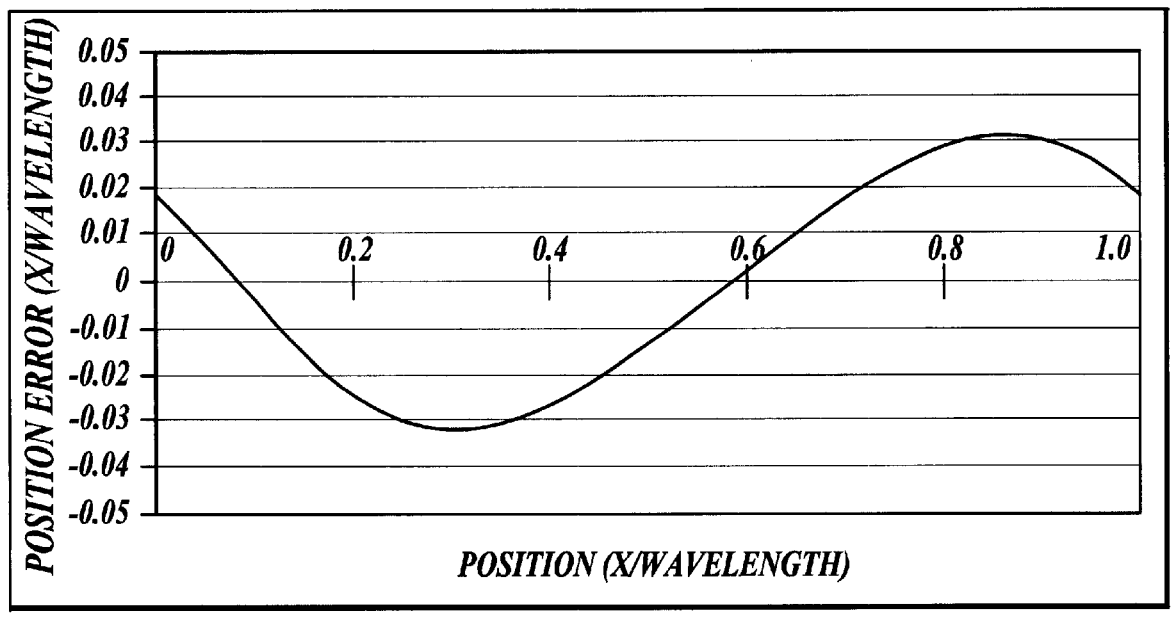
FIG. 5B is a position error diagram showing the position error that would otherwise be caused by the offset of the signal in FIG. 5A, for which the method of the present invention can compensate.

FIG. 5B illustrates the position error caused by the 250 mV offset of signal V2 in FIG. 5A. The position error is shown in terms of wavelengths, and is shown to vary from approximately −0.03 to approximately +0.03. By utilizing the self-calibration methods of the present invention, the offset can be compensated, so as to substantially eliminate the illustrated position measurement error.

Figure 6A:
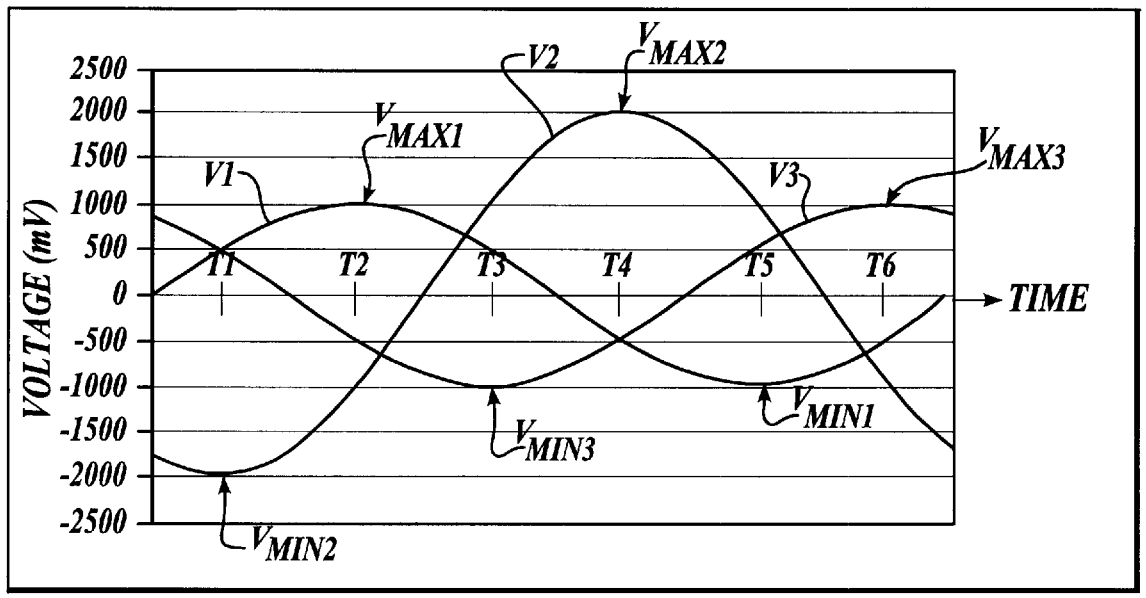
FIG. 6A is a time diagram of the output signals of a 3-phase transducer system, where one of the signals has a larger amplitude, and illustrating the method of the present invention.

FIG. 6A similarly shows three signals from a 3-phase system. Similar in phase to FIG. 5A above, at a time T1, the signal V2 is at a minimum value $V_{min2}$ of approximately −2000 mV. Once this minimum value is identified by the system, it is stored as a minimum value for signal V2. Similarly, at time T2, the signal V1 is at a maximum value $V_{max1}$ of approximately 1000 mV. Once this maximum value is identified by the system, it is stored as a maximum value for signal V1. The process continues for time T3 where the signal V3 is at a minimum value $V_{min3}$ of approximately −1000 mV, at time T4 where the signal V2 is at a maximum value $V_{max2}$ of approximately 2000 mV, at time T5 where the signal V1 is at a minimum value $V_{min1}$ of approximately −1000 mV, and at time T6 where the signal V3 is at a maximum value $V_{max3}$ of approximately 1000 mV.

Utilizing these values and the above equations, it can be determined that the signals V1 and V3 have no offset or amplitude mismatch between them as they range from 1000 mV to −1000 mV. However, signal V2 is shown to have approximately twice the amplitude of signals V1 and V3, as it ranges from 2000 mV to −2000 mV.

Figure 6B:
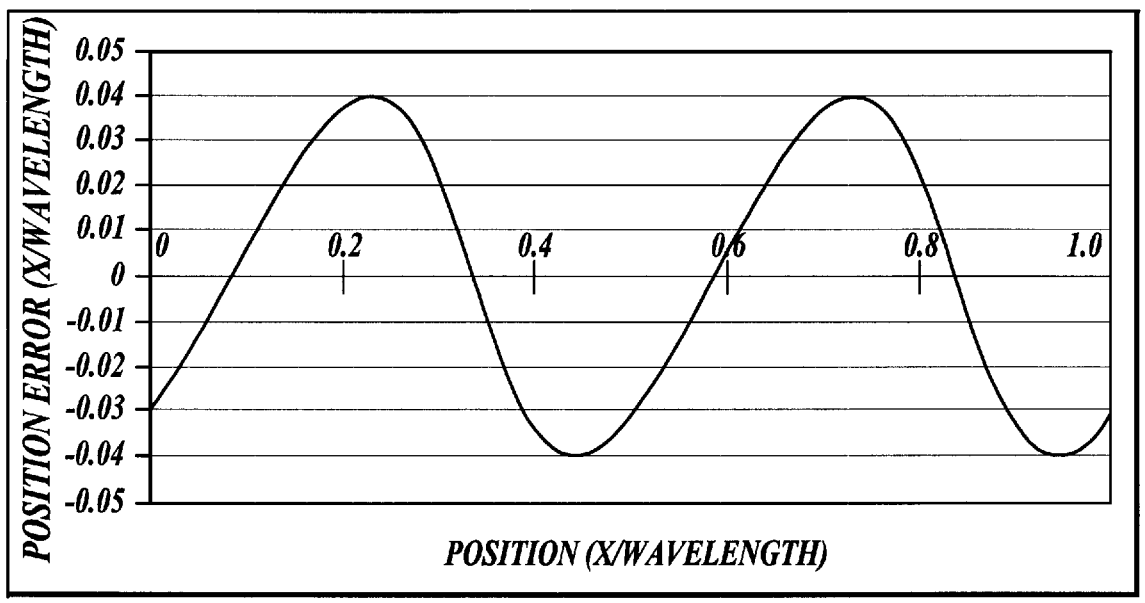
FIG. 6B is a position error diagram illustrating the position error that would otherwise be caused by the larger amplitude of the signal in FIG. 6A, for which the method of the present invention can compensate.

FIG. 6B shows the resulting position errors caused by the larger amplitude of signal V2 in FIG. 6A. The position error is shown in terms of wavelengths, and is shown to vary from approximately +0.04 to approximately −0.04. By utilizing the self-calibration methods of the present invention, the amplitude mismatch can be compensated, so as to substantially eliminate the illustrated position measurement error.

FIG. 7A again shows three signals of a 3-phase system. At time T1, the signal V2 is at a minimum value $V_{min2}$ of approximately −1500 mV. Once this minimum value is identified by the system, it is stored as a minimum value for signal V2. At time T2, signal V1 is at a maximum value $V_{max1}$ of approximately 1000 mV. Once this maximum value is identified by the system, it is stored as a maximum value for signal V1. The process continues for time T3 when the signal V3 is at a minimum value $V_{min3}$ of approximately −750 mV, at time T4 when the signal V2 is at a maximum value $V_{max2}$ of approximately 1500 mV, at time T5 when the signal V1 is at a minimum value $V_{min1}$ of approximately −1000 mV, and at time T6 when the signal V3 is at a maximum value $V_{max3}$ of approximately 1000 mV.

Using these values and the above equations, it can be determined that signal V1 has no offset, and has an amplitude such that it ranges from +1000 mV to −1000 mV. However, signal V2 has a relative amplitude mismatch in the form of a larger amplitude, such that it ranges from +1500 mV to −1500 mV. In addition, the signal V3 has a +250 mV offset, such that it ranges from +1250 mV to −750 mV.

Figure 7A:
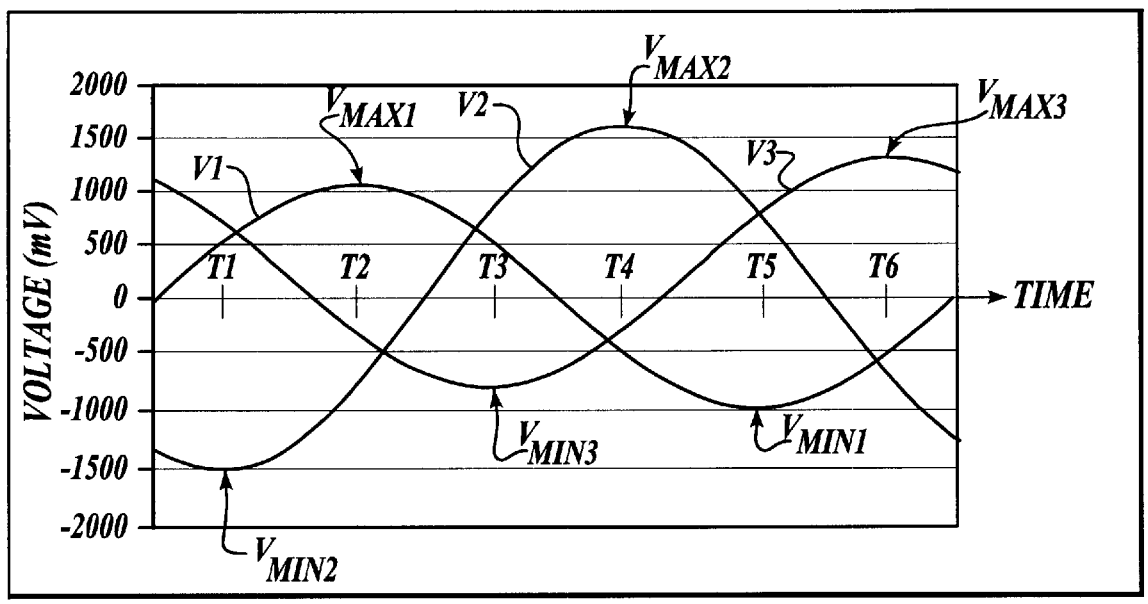
FIG. 7A is a time diagram of the output signals of a 3-phase transducer system, where one of the signals has an offset, and another signal has a larger amplitude, and illustrating the method of the present invention.
Figure 7B:
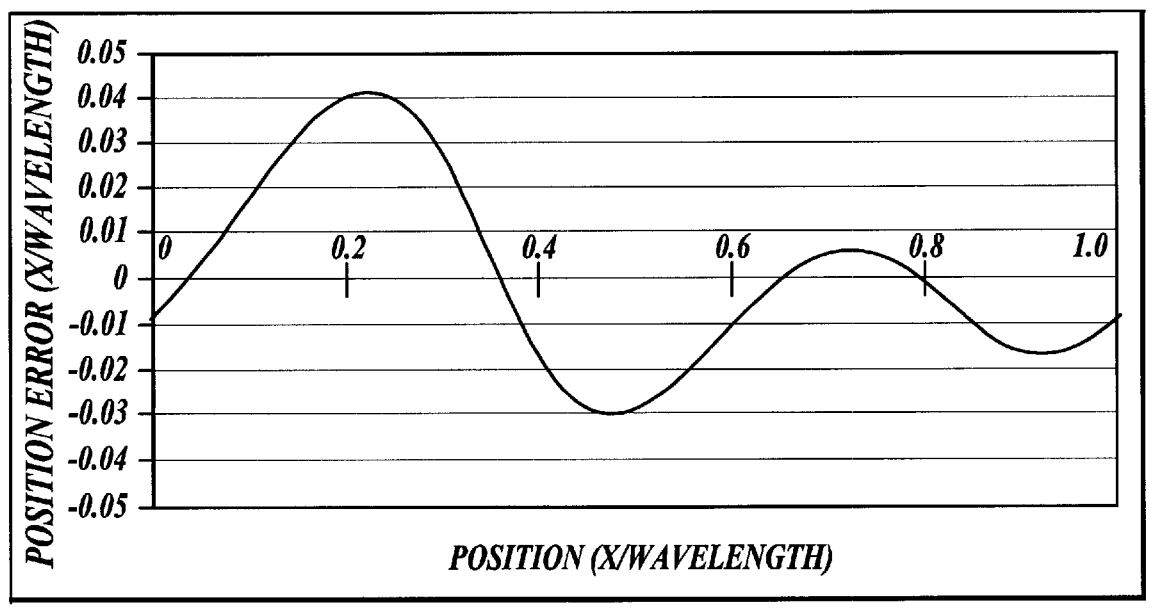
FIG. 7B is a position error diagram illustrating the position error that would otherwise be caused by the offset and larger amplitude of the signals of FIG. 7A, for which the method of the present invention can compensate.

FIG. 7B illustrates the position error caused by the larger amplitude of signal V2 and the offset of signal V3. The position error is shown in terms of wavelengths, and is shown to vary from approximately 0.04 to approximately −0.03. By utilizing the self-calibration methods of the present invention, the offset and the amplitude mismatch can be compensated for so as to substantially eliminate the illustrated position measurement errors.

Figure 8:
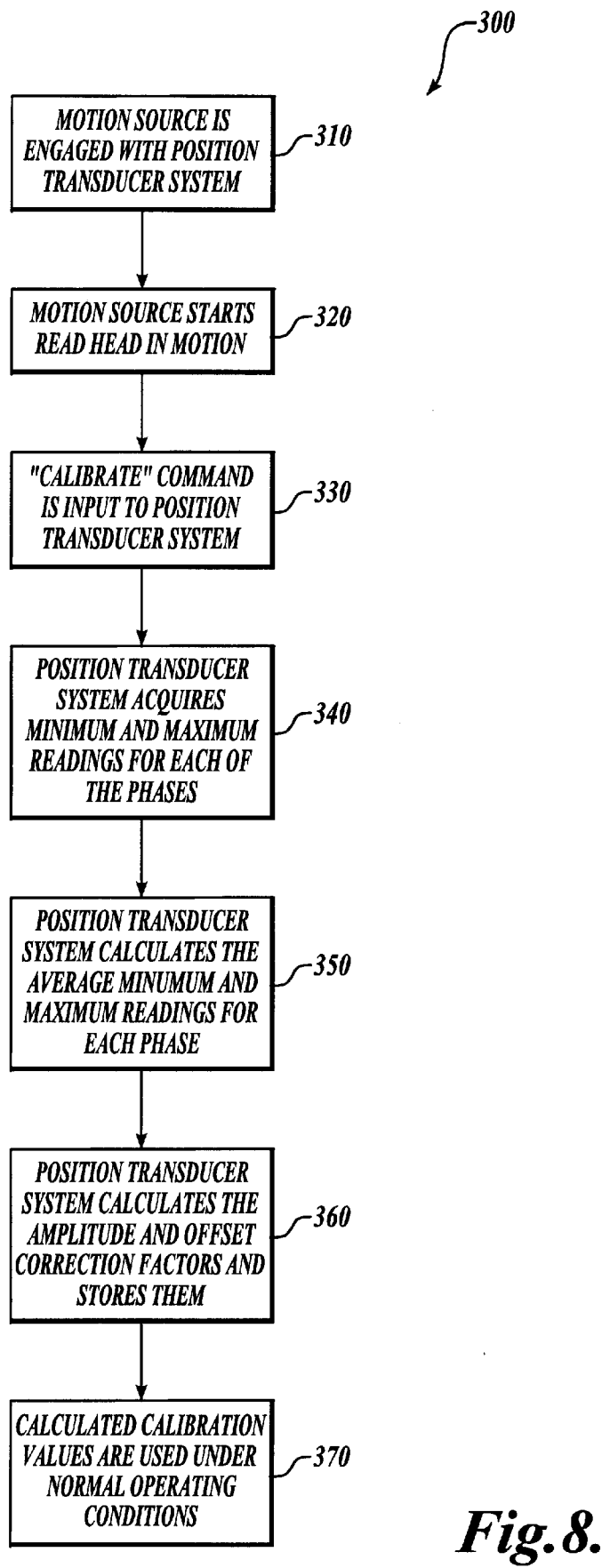
FIG. 8 is a flow diagram illustrating a detailed embodiment of one embodiment of the present invention.

FIG. 8 shows a flow diagram of one embodiment of a detailed implementation of the present invention. At a block 310, a motion source is engaged with the position transducer to create relative motion between the read head and scale. In a first exemplary embodiment, the motion source is an automated motion system which is coupled to the position transducer. In a second exemplary embodiment, the motion source is a person. That is, the position transducer may be incorporated into handheld measuring tool or some other device which is moved manually. In one embodiment, the position transducer system may encompass an inductive linear encoder.

At a block 320, the motion source starts the read head in a motion according to the previously described velocity constraints of the position transducer system. As an example, in one embodiment the read head could be moved at up to 15 mm per second for 7 seconds, or 105 mm. At this rate, each wavelength is sampled approximately every 22 um with a 1.5 millisecond sample rate, and very good calibration would be provided for a transducer with a 3 millimeter wavelength.

At a block 330, a "calibrate" command is input to the position transducer system, which begins to perform calibration operations. For example, a button or a coded button sequence of the position transducer system may be operated to initiate calibration operations.

At a block 340, the position transducer system will acquire, that is, sample the minimum and maximum signal values for each of the phases. In various exemplary embodiments the signals that come directly from the position transducer are in the form of sampled and held voltages, which are then converted in a signal processor to ADC readings. The ADC readings are then input by the next operation as sample signals corresponding to the direct signal samples. As an example, in one embodiment the readings may be taken for each of three phases on each of three scale tracks, each scale track also sometimes referred to as a scale herein, for which data will be collected for 10 wavelengths, which in one particular embodiment would be a maximum of about 32 mm. At this point, the process performs the "calibration sample routine" as will be described below with reference to FIGS. 9A–9C.

It should also be appreciated that alternative operations for the blocks 330 and 340 have been have been previously described with regard to a calibration mode of operation for the signal processor and corrector 210, and the min-max analyzer 220, as will be apparent to one skilled in the art. For example, as previously described herein, in various exemplary embodiments, the signal processor and corrector 210 may sample/input 3-phase transducer signals from the transducer 100, process the signals into quadrature signal equivalent values by known methods, and then these signal values may be input by the next operation as sample signals corresponding to the direct signal samples, despite their converted form. At a block 350, once the sample data has been acquired and/or converted to corresponding sample signals input by the operations of block 350, the position transducer system will calculate the average minimum and maximum signal values for each phase. In one embodiment where the data was collected over 10 wavelengths, the calibration factors are calculated according to the following equations:

$$\max[scale][phase] = \frac{\max sum[scale][phase]}{10} \quad (9)$$

$$\min[scale][phase] = \frac{\min sum[scale][phase]}{10} \quad (10)$$

The above equations (9) and (10) indicate that for a given scale or scale track indicated by [scale] and a given phase signal of that scale or scale track indicated by [phase], the maximum and minimum of that signal are determined by taking the average of the 10 maximum and minimum data points acquired over the 10 wavelengths.

At a block 360, the position transducer system will calculate the amplitude and offset correction factors and store them. In one embodiment, values may be stored in a nonvolatile memory of the position transducer system. In addition, certain equations may be used for calculating the calibration constants, as indicated below:

$$offset\ correction[scale][phase] = \quad (11)$$
$$\frac{\max[scale][phase] + \min[scale][phase]}{2}$$

$$amplitude\ correction[scale][phase] = \quad (12)$$
$$\frac{\max[scale][phase] - \min[scale][phase]}{2}$$

The above equations (11) and (12) indicate that for a given scale and phase, the offset correction and amplitude correction can be determined using the results from the above equations (9) and (10).

With regard to phase mismatch correction, the phase mismatch errors are found by first removing the amplitude mismatch and offset errors from each phase signal, and then comparing the relative values of the signals at a given position point in relation to what they ought to be with no phase relation error, based on the expected signal shape. Such operations are easily performed by one skilled in the art. However, as previously discussed with regard to the operations of block 270 of FIG. 2, it should it should be appreciated that in embodiments where a phase mismatch is determined, signal data from all phases is usually acquired for at least one shared position point.

In various exemplary position transducer systems, all phase data is acquired and processed in parallel. In such cases, no special motion considerations are required during the calibration operation, except as otherwise disclosed herein. However, in other exemplary position transducer systems with extremely limited power and processing speed, the data for each phase is acquired serially. Under motion conditions, serial data corresponds to data taken at different positions. However, in various exemplary embodiments, again with an emphasis on simple programming and processing, serial data is easily corrected for the effects of motion, if the motion is a constant velocity. For example, in the above example where the motion source was an automated motion system, a constant velocity is used for the movement of the read head. In a first exemplary embodiment, the position transducer system is be moved at a prescribed velocity corresponding to the calibration program assumptions. The additional contribution of the motion to the apparent phase relation is then easily determined from the known velocity and the known sample timing, according to methods well known in the art. In a second exemplary embodiment, the velocity is unknown but constant, and the wavelength of the transducer and the sample timing are known by design. It is a simple programming task to identify equal signal values of an individual phase signal that are spaced 360 degrees apart. Furthermore, the number of samples taken between these signal values is also easily determined. Therefore, a conversion factor which is the "number of samples per phase shift increment" is easily determined for any constant velocity. After removing the amplitude mismatch and offset errors from each phase signal in the stored calibration data, equal signal values of each phase should occur at a design phase difference which is easily converted to "number of samples" from the conversion factor. By inspecting the offset and amplitude corrected calibration data, any deviation from the design phase difference is then easily corrected by methods well known to one skilled in the art.

At a block 370, the calculated signal correction values are used under normal operating conditions. In a first exemplary embodiment, the position transducer system automatically ends the calibration mode and returns to normal operation after the operations of block 360. In other exemplary embodiments, the user or host system reboots a processor or micro-controller of the position transducer system so that the new signal correction values are used under normal operating conditions. The following equations illustrate how the calibration constants may be applied as signal correction values to correct the ADC signal values for each scale and phase:

$$New\ ADC[scale][Phase0] = ADC[scale][Phase0] - O[scale][Phase0] \quad (13)$$

$$New\ ADC[scale][Phase1] = \quad (14)$$
$$\frac{(ADC[scale][Phase1] - O[scale][Phase1]) * A[scale][Phase0]}{A[scale][Phase1]}$$

$$New\ ADC[scale][Phase2] = \quad (15)$$
$$\frac{(ADC[scale][Phase2] - O[scale][Phase2]) * A[scale][Phase0]}{A[scale][Phase2]}$$

in the above equations, A[ ][ ] represents the amplitude correction factor and O[ ][ ] represents the offset correction factor. Phase mismatch correction may also be performed by methods well known to one skilled in the art. It should further be appreciated that when the operations of block 350 are performed on converted sample signals, such as the "3-phase to quadrature" sample signals previously described, that operations analogous to, but not identical with the operations related to Equations 13–15 will be applied to the converted quadrature signals during normal operations. Such analogous operations are easily determined by one skilled in the art. In such a case the transducer system signals corrected by the analogous signal correction values are not the direct signals from the position transducer or their corresponding ADC values, but the converted "3-phase to quadrature" signals of the transducer system.

With regard to the method of FIG. 8, in various exemplary embodiments it is preferred that one or more calibration conditions are maintained. In one condition, no commands are issued to the position transducer system after the "calibrate" command, except for a halt calibration command. In a simple calibration program suitable for systems with minimal processing and memory capability, this is because the position transducer system may respond to a command request and miss one or several phase peaks in order to respond to the request, potentially corrupting the calibration data acquired in comparison to the operating assumptions of the calibration program. In another condition, the read head moves in only one direction and at an approximately constant velocity throughout calibration. Again, this constraint greatly simplifies the programming, processing and memory requirements and insures that the operating constraints of a minimal processing system are not exceeded. However, it should be noted that the initial direction of movement of the scale is not important.

The above method corrects at least for signal offset and amplitude mismatch. The method is fast and effective. The method requires no external processing and in the example described above could take less than 10 seconds. The fact that no external processing or special positioning is required greatly reduces the amount of time required to perform the calibration run since no special setup is required and no data needs to be transmitted to an external computer, so no special control interface or protocol is required. All data processing can be performed by a micro-controller of the position transducer system.

Figure 9A:
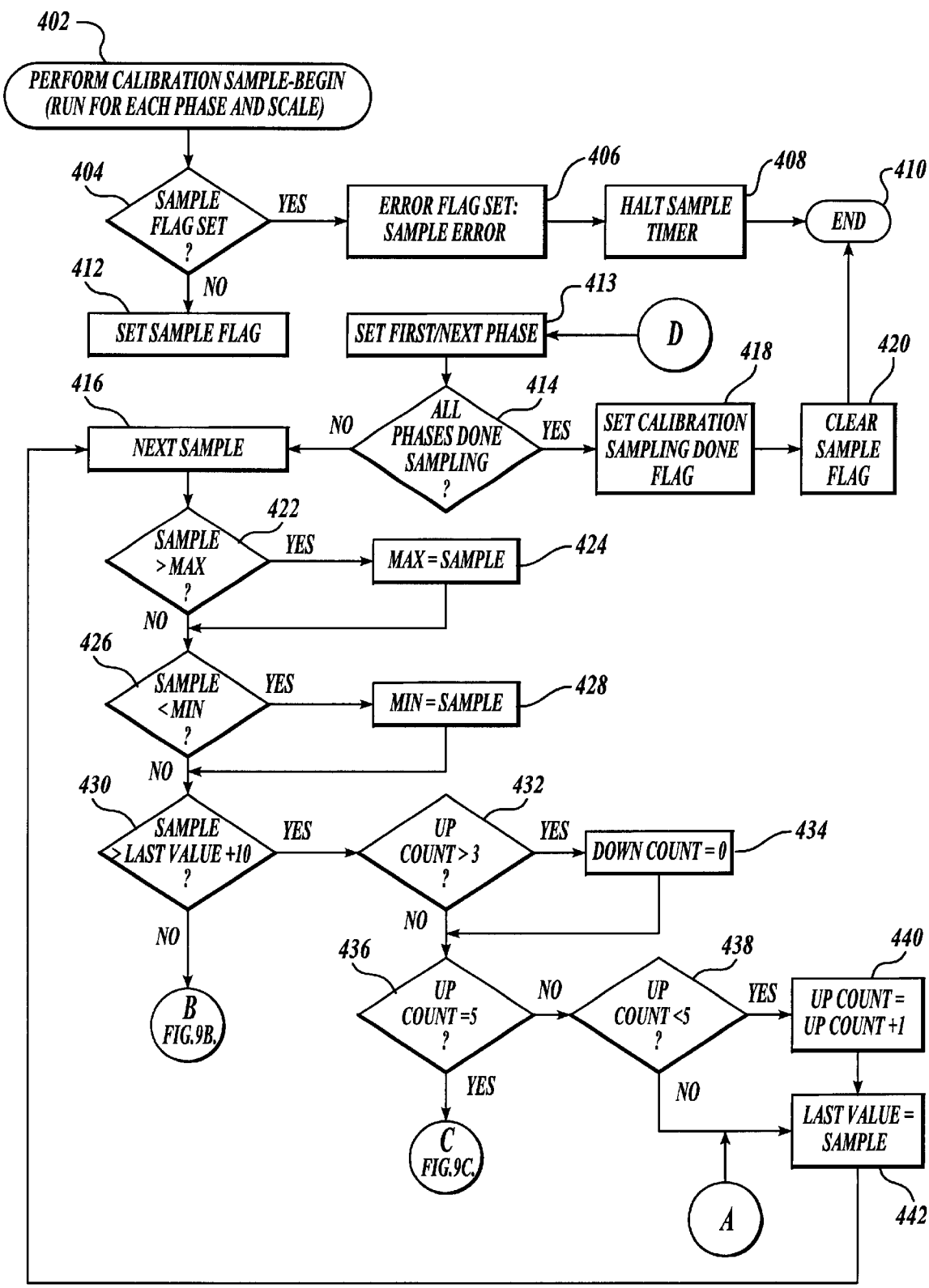
FIGS. 9A, 9B and 9C are flow diagrams of the calibration sample routine of FIG. 8.
Figure 9B:
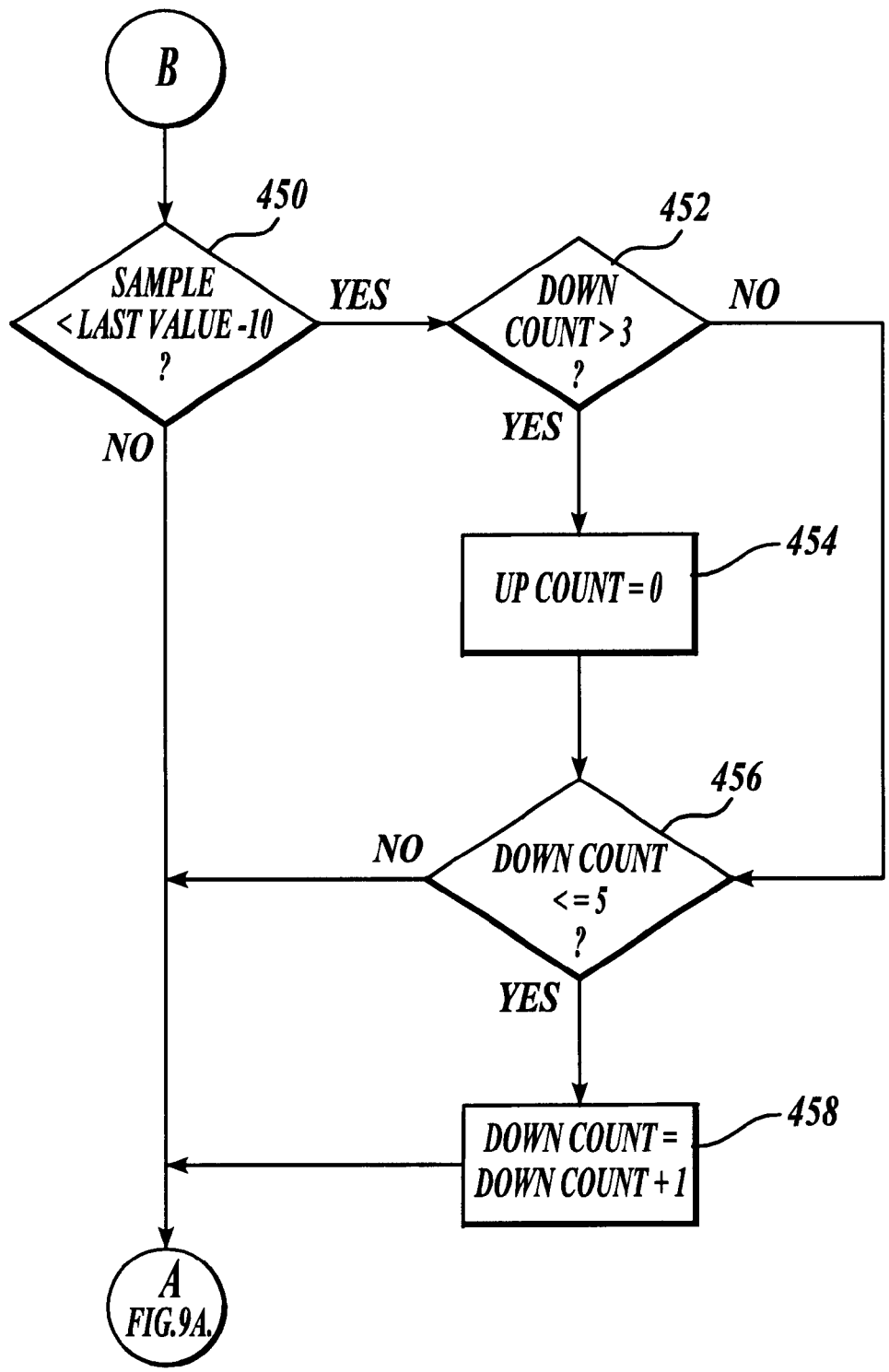
Figure 9C:
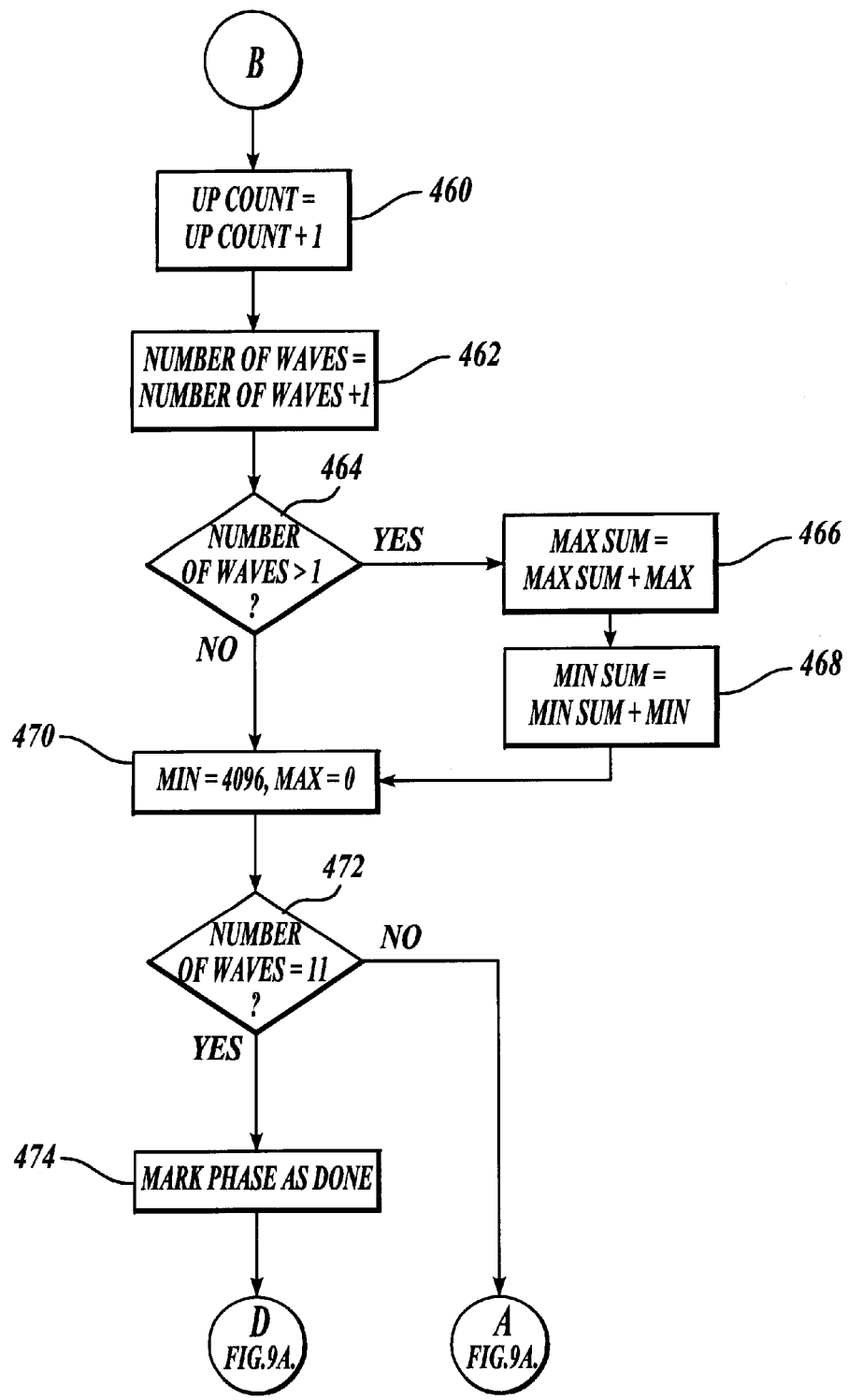

FIGS. 9A–9C illustrate a detailed embodiment of one type of calibration sample routine, as described above with reference to block 340 of FIG. 8. At a block 402, the perform calibration sample command is input to, or initiated by, the position transducer system. The calibration sample command may be input from a calibration mode initiating device such as a button, a control interface, a wireless link or the like. This routine encompasses a data acquisition run for each phase of each scale of the 3-scale, 3-phase system in the example for FIG. 8. At a decision block 404, the routine determines whether a sample flag has been set. That is, whether the operations of this routine are already in progress. If the sample flag has been set, the routine proceeds to a block 406, where an error flag is set for a sample error. At a block 408, the sample timer is halted. At a block 410, the routine ends.

Returning to block 404, if the sample flag is not set, then the routine proceeds to a block 412. At block 412 the sample flag is set, indicating that the operations of this routine are in progress. At a block 413, the phase for which sample data is desired is set to the first phase for a first iteration, or to the next phase once the data acquisition for a phase is completed. In addition, the routine may also reach the block 413 from a point D, which is continued from FIG. 9C, as will be described in more detail below. Next, at a decision block 414 the routine determines whether sampling has been completed for all phases. If the sampling has been completed for all phases, the routine proceeds to a block 418. At block 418 the calibration sampling done flag is set. At a block 420 the sample flag is cleared, afterwards the routine proceeds to the block 410, where the routine ends.

Returning to decision block 414, if all the phases have not been calibrated, the routine proceeds to a block 416. At block 416, the current phase of a scale is sampled. Then, at a decision block 422, the routine determines whether the sample is greater than a predetermined or previous maximum. If the sample is greater than the predetermined or previous maximum, then the routine proceeds to a block 424 and the sample is stored as a signal maximum. From block 424, the routine proceeds to a decision block 426, which will be described below.

Returning to block 422, if the sample is not greater than the preset or previous maximum, then the routine proceeds to the decision block 426. At the decision block 426, the routine determines whether the sample is less than a minimum predetermined or previous value. If the sample is less than a predetermined or previous minimum value then the routine proceeds to a block 428. At block 428 the sample is stored as a minimum signal value. From block 428, the routine proceeds to a decision block 430, which will be described below.

Returning to decision block 426, if the sample is not less than the predetermined or previous minimum value, then the routine proceeds to the decision block 430. At the decision block 430, the routine determines whether an ADC value of the sample is greater than last value (a stored program variable) plus 10. If the sample is greater than the last value plus 10, then the routine proceeds to a decision block 432. If the sample is not greater than last value plus 10, then the routine proceeds to a point B, which is continued in FIG. 9B, as will be described in more detail below. In general, a sufficient ADC value increase is intended to indicate that the signal from the sampled phase is in a steep portion of the signal curve, which indicates that the signal curve is rising in the vicinity, of a zero-crossing. Zero-crossing information is used in support of a wavelength counter, as described further below. Thus, the increase value of 10 is chosen in relation to a knowledge of the total ADC range, the signal shape, the sample rate, and a velocity assumption.

Returning to decision block 432, the routine determines whether the up-count is greater than 3. If the up-count is greater than 3, then the routine proceeds to block 434 where the down-count is set to zero. From block 434, the routine proceeds to decision block 436. If at the decision block 432, the up-count is not greater than 3, then the routine proceeds to the decision block 436. At the decision block 436, the routine determines whether the up-count is equal to 5. If the up-count is equal to 5, then the routine proceeds to a point C as continued in FIG. 9C, as will be described in more detail below.

Returning to decision block 436, if the up-count is not equal to 5, then the routine proceeds to a decision block 438. At decision block 438, the routine determines whether the up-count is less than 5. If the up-count is less than 5, then the routine proceeds to a block 440, where the up-count is set equal to the up-count plus 1. The routine then proceeds to a block 442. In general, the operations of blocks 432–440 reject sample noise and support the determination of a zero-crossing.

Returning to decision block 438, if the up-count is not less than 5, then the routine proceeds to the block 442. In addition, the routine may also reach the block 442 from a point A, which is continued from both FIGS. 9B and 9C, as will be described in more detail below. At block 442, the value of last value is set equal to the sample value, and the routine then returns to the operations of block 416.

As illustrated in FIG. 9B, from a point B (continued from block 430 of FIG. 9A), the routine proceeds to a decision block 450. At decision block 450, the routine determines whether the sample is less than the last value, minus 10. In general, a sufficient ADC value decrease is intended to indicate that the signal from the sampled phase is in a steep portion of the signal curve, which indicates that the signal curve is falling in the vicinity of a zero-crossing. Zero-crossing information is used in support of a wavelength counter, as described further below. If the sample is less than the last value minus 10, then the routine proceeds to a decision block 452. At decision block 452, the routine determines whether the down-count is greater than 3. If the down-count is greater than 3, then the routine proceeds to a block 454, where the up-count is set to zero. From block 454, the routine proceeds to a decision block 456, which will be described below.

Returning to block 452, if the down-count is not greater than 3, then the routine proceeds to the decision block 456. At the decision block 456, the routine determines whether the down-count is less than or equal to 5. If the down-count is less than or equal to 5, then the routine proceeds to a block 458 where the down-count is set equal to the down-count plus 1. From block 458, the routine proceeds to point A as described above with reference to FIG. 9A. In general, the operations of blocks 452–458 reject sample noise and support the determination of a zero-crossing. Returning to block 450, if the sample is not less than the last value minus 10, then the routine proceeds to the point A.

As illustrated in FIG. 9C, from the point C (from block 436 of FIG. 9A), the routine proceeds to a block 460 where the up-count is set equal to the up-count plus 1. At a block 462, the number of waves (wavelengths) is set equal to the number of waves plus 1. At a decision block 464, the routine determines whether the number of waves is greater than 1. If the number of waves is greater than 1, then the routine proceeds to a block 466, where the max sum is set equal to the max sum plus max. At a block 468, the min sum is set equal to the min sum plus min. The operations of blocks 466–468 incorporate previously determined peak maximum and peak minimum signal values into an average. From block 468, the routine proceeds to a block 470.

Returning to the decision block 464, if the number of waves is not greater than 1, then the routine proceeds to the block 470. At the block 470 the min is set equal to 4,096, and the max is set equal to zero, that is the values are reset as a basis for determining the peak values of the next wave. From block 470 the routine proceeds to a decision block 472, where the routine determines whether the number of waves equals 11. If the number of waves equals 11, then the routine proceeds to a block 474 where the phase is marked as done. From block 474, the routine proceeds to point D, as described above with reference to FIG. 9A.

Returning to decision block 472, if the number of waves does not equal 11, then the routine proceeds to point A, as described above with reference to FIG. 9A.

Figure 10:
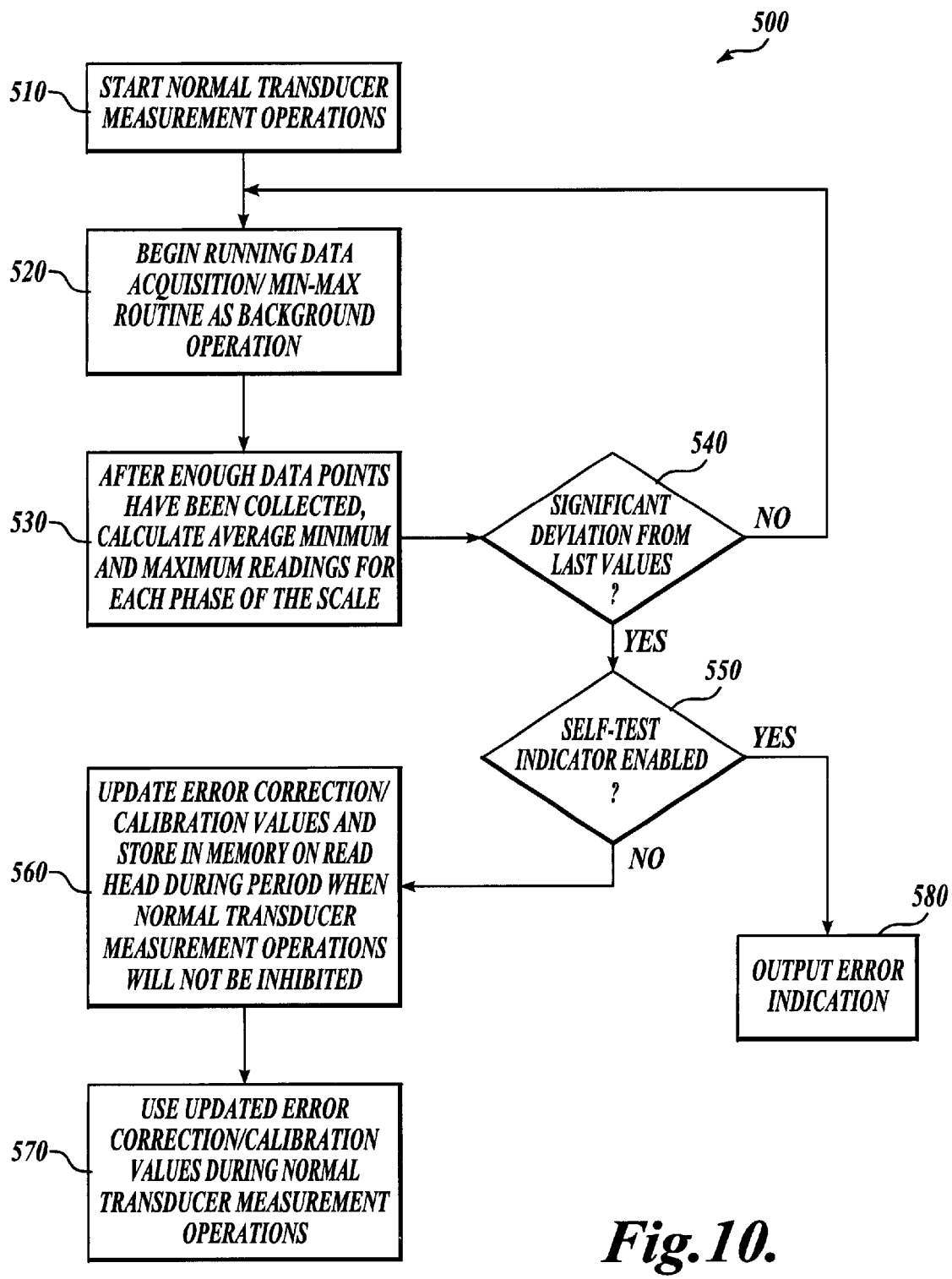
FIG. 10 is a flow diagram showing the method of the present invention as run in a background mode such that it does not inhibit normal transducer operation.

FIG. 10 is a flow diagram showing the method of the present invention as run in one exemplary embodiment of a background mode for performing signal mismatch determining operations without inhibiting normal transducer operation. This embodiment includes a self-test operation capability. The background mode routine 500 begins at a block 510 where normal transducer measurement operations are begun.

At a block 520, calibration data acquisition/min-max operations according to the previously described principles of the invention are run as a background operation. Again, because the methods of the present invention are fast and require relatively few data points to be stored, they lends themselves particularly well to being run in a background mode, even in systems which are low-power systems and include minimal processing capability and speed. In general, the background operation is easily achieved with the aid to a few additional operations to supplement the previously described principles and operations.

For example, in one exemplary embodiment it is useful to implement a velocity checking operation according to methods known to one skilled in the art. The velocity checking operation determines when the velocity of the read head is within certain velocity constraints of the system, as previously described, and within the range of any particular set of programming assumptions for the background signal mismatch determining operations. This velocity will depend in general on the processing speed, memory, and background calibration program complexity of the position transducer system. The velocity checking operation in some respects performs a similar function to the operations of blocks 260 and 262 of FIG. 2, in that it establishes a suitable motion and initiates data acquisition. However, the velocity checking operation selects suitable periods of motion among randomly occurring motion, rather than instigating a suitable period of motion.

In further exemplary embodiments, it is useful to implement a scan length checking operation. The scan length checking operation determines how many wavelengths are traveled during the time that the velocity checking operation has enabled data acquisition. This may be done by a variety of methods that will be apparent to one skilled in the art. When the velocity becomes unacceptable before a prescribed number of wavelengths is accumulated, the background operations may be re-initialized. Conversely, when a prescribed number of wavelengths is accumulated during an acceptable velocity period, it is assured that enough data points have been collected to cease data acquisition and to proceed with background signal mismatch determination, as described below.

At a block 530, after enough data points have been collected, the position transducer system will calculate the average minimum and maximum values for each phase on each scale. Again, this process is performed in a manner so that it will not inhibit normal transducer measurement operations. Then the routine proceeds to a decision block 540. At the decision block 540, the routine determines whether a new average minimum or maximum value (or signal correction value, a mismatch or any other calibration value derived from these values) for any phase is significantly different from one or more generations of its previous values, and/or from a standard set of such values. The standard set of values may determined, for example, based on a statistical study of previous similar transducer systems, or from design knowledge regarding the transducer system. If none of the new values are significantly different from the previous values and/or standard values, then the routine resumes background operations at block 520. If one of the new values is significantly different from its previous value, then the routine continues to a decision block 550.

At the decision block 550, the routine determines whether a self-test indicator is enabled. In various exemplary embodiments, the self-test indicator is enabled by design, or it is an option selectable by a user of the position transducer system. In general, the self-test indicator is enabled if it is desired to check for the cause of the signal changes before accepting re-calibration. This would be desirable, for example, as a contamination warning, as previously described. If the self-test indicator is not enabled, the routine continues to a block 560.

At block 560, the routine updates the signal correction values and stores them in memory on the position transducer system during a period when normal transducer measurement operations will not be inhibited. Then, at a block 570, the updated signal correction values are used during normal transducer measurement operations.

Returning to decision block 550, if the self-test indicator is enabled, the routine continues to a block 580. At the block 580, an error indication signal is output. In various embodiments, the error indication signal activates an error indication device such as a warning light or error code display of the position transducer system. Normal operation may then be continued, or interrupted, in various implementations.

It will be appreciated that the present invention has a number of advantages over prior art techniques. As one advantage, the method of the present invention does not require an external position reference, or even approximate positioning, in order to calibrate the transducer system. In addition, because the method only requires that key data be taken "near" to the peaks of the output waveform, and over relatively few wavelengths of the scale, relatively few data points are required to perform the desired calculations. In addition, the calculation method of the present invention is relatively straightforward from the data, and does not require any iteration. This is in contrast to the above-described prior art '363 patent, for which the calculation method was iterative, and equidistant points were important to the calculation, thus causing signal errors to be compensated for iteratively, and requiring the method to converge.

As described above, the present invention requires only that the fundamental signal output, in the form of a spatial wavelength from the transducer, be analyzed. The method compensates for the largest errors in the transducer, in particular the larger offset and amplitude errors. Because the method uses only the peak values of the output function, it is not so sensitive to the actual shape of the output/position transfer function. The method is further simplified by the fact that key data points do not need to be taken or interpolated at equidistant points along the waveform, as is typically required for Fourier transform type data.

The present invention is also particularly useful for 3-phase and higher systems. Since the present invention works directly off the raw output signals and uses only the peak values, it can be applied to any number of phases. Thus, while the above examples have primarily been shown as applied to 2- or 3-phase systems, it will be understood that the method may be applied to any number of phases.

It will be appreciated that the present invention can be used in a number of environments, and for a number of different functions. The above-described calibration methods can be used in a factory environment, where robotic calibration equipment is available. The invention can also be utilized as part of a user-initiated "calibration mode", such as might be activated by a calibration button on the measuring device. Further, as described above, the method of the present invention is particularly well-suited for being run automatically in a background mode, including the capability to provide a comprehensive signal integrity check and error indication, without inhibiting normal transducer operation. The simplicity and speed of the present invention allows the error correction and self-calibration functions to be performed more frequently, thus increasing the likelihood of more consistent device accuracy.

While preferred and alternative embodiments of the invention have been illustrated and described, one skilled in the art will recognize many further variations according to the systems and methods of this invention. Thus, it will be appreciated that various changes can be made therein without departing from the spirit and scope of the invention.

The embodiments of the invention in which an exclusive property or privilege is claimed are defined as follows:

1. A transducer system, comprising:
   a position transducer having a read head and a scale, the position transducer generating two or more transducer signals that vary as a function of relative position between the read head and the scale; and
   a signal processing and control electronics usable to sample at least two of the transducer signals and input at least two corresponding sample signals to an analyzer, wherein:
   the analyzer includes a routine for analyzing the at least two sample signals to determine a plurality of peak signal values and determining at least one signal correction value based on at least two of the plurality of peak signal values, the at least one signal correction value being usable to correct at least one signal of the transducer system.

2. The transducer system of claim 1, wherein the at least one signal correction value is used to correct the at least one signal of the transducer system before a position of the position transducer is determined.

3. The transducer system of claim 1, the signal processing and control electronics further comprising a memory portion that receives and stores the at least one signal correction value, wherein the stored at least one signal correction value is usable to correct the at least one signal of the transducer system before a position of the position transducer is determined by the signal processing and control electronics.

4. The transducer system of claim 3, wherein the memory portion retains at least one of a standard at least one signal correction value and a previous-generation at least one signal correction value when the memory receives a more current at least one signal correction value.

5. The transducer system of claim 4, wherein the transducer system is operable to perform a self-diagnostic function based on comparing the retained at least one signal correction value and the more current at least one signal correction value.

6. The transducer system of claim 5, wherein the transducer system operates to perform the self-diagnostic function when one of a self-test command and a calibration command is input to the transducer system.

7. The transducer system of claim 5, wherein the transducer system operates to perform the self-diagnostic function as a background processing task during a normal position-determining mode of operation.

8. The transducer system of claim 5, the transducer system further comprising an error indicating device responsive to an error indicating signal activated as a result of the self-diagnostic function.

9. The transducer system of claim 1, wherein the transducer system is operable to sample the at least two transducer signals during a motion of the read head relative to the scale.

10. The transducer system of claim 9, wherein the transducer system performs the sampling without regard to the relative position between the read head and scale.

11. The transducer system of claim 1, wherein the analyzer comprises a portion of the signal processing and control electronics.

12. The transducer system of claim 1, wherein at least a portion of the signal processing and control electronics are housed in the read head.

13. The transducer system of claim 1, wherein the position transducer generates one of quadrature signals, 3-phase signals, multiple-phase signals from one or more scale tracks, and an arbitrary number of transducer signals that are spaced over 360° of phase.

14. The transducer system of claim 1, wherein a plurality of signal correction values based on the peak signal values are usable to correct at least one transducer signal for offset and amplitude errors.

15. The transducer system of claim 14, wherein a plurality of transducer signals corrected for offset and amplitude errors are used to determine at least one signal correction value which corrects a phase relation error between at least two of the plurality of transducer signals.

16. The transducer system of claim 1, the transducer further comprising a calibration mode initiating device responsive to a calibration initiating action of an operator of the transducer system to provide a calibration initiating signal, wherein, in response to the calibration initiating signal:
the signal processing and control electronics samples at least two of the transducer signals and inputs at least two corresponding sample signals to an analyzer;
the analyzer analyzes the at least two sample signals to determine a plurality of peak signal values and determines at least one signal correction value based on at least two of the plurality of peak signal values, the at least one signal correction value being usable to correct at least one signal of the transducer system.

17. The transducer system of claim 1, the scale comprising one of a linear scale, a rotary scale and an angular scale.

18. The transducer system of claim 1, the position transducer comprising one of an inductive transducer, a magnetic transducer, a magneto resistive transducer.

19. A method for operating a transducer system, the transducer system comprising a position transducer having a read head and a scale, the position transducer generating two or more transducer signals that vary as a function of relative position between the read head and the scale, and a transducer system electronics usable to sample and analyze at least two of the transducer signals, the method comprising:
sampling at least two of the transducer signals;
analyzing sample signals corresponding to the at least two transducer signals to determine a plurality of peak signal values; and
determining at least one signal correction value based on at least two of the plurality of peak signal values, the at least one signal correction value being usable to correct at least one signal of the transducer system.

20. The method of claim 19, further comprising;
correcting at least one signal of the transducer system based on the at least one signal correction value; and
determining a position of the position transducer based on the corrected at least one signal.

21. The method of claim 19, further comprising:
receiving and storing the at least one signal correction value with a memory portion of the transducer system electronics;
correcting at least one signal of the transducer system based on the at least one signal correction value; and
determining a position of the position transducer based on the corrected at least one signal.

22. The method of claim 21, further comprising:
retaining at least one of a standard at least one signal correction value and the previous-generation at least one signal correction value when the memory portion receives and stores a more current at least one signal correction value.

23. The method of claim 22, further comprising:
performing a self-diagnostic function based on comparing the retained at least one signal correction value and the more current at least one signal correction value.

24. The method of claim 23, further comprising:
inputting one of a self-test command and a calibration command to initiate the step of performing the self-diagnostic function.

25. The method of claim 23, wherein the step of performing the self-diagnostic function is performed as a background processing task during a normal position-determining mode of operation of the transducer system.

26. The method of claim 23, further comprising:
activating an error indication if the step of comparing the retained at least one signal correction value and the more current at least one signal correction value indicates an error condition.

27. The method of claim 19, wherein the function of relative position between the read head and the scale is a periodic function and the step of sampling the at least two transducer signals includes sampling the at least two transducer signals over a plurality of wavelengths of the periodic function.

28. The method of claim 27, wherein the step of sampling the at least two transducer signals further includes sampling the signals at a spacing less than a maximum sample spacing, at least in the vicinity of the peaks of the transducer signals, wherein the maximum sample spacing is less than at least one of 4%, 2%, 1.5, 1% and 0.75% of the wavelength of the periodic function.

29. The method of claim 27, wherein the step of sampling the at least two transducer signals is performed during a motion of the read head relative to the scale.

30. The method of claim 29, wherein the motion of the read head relative to the scale comprises one of a motion constrained based on the characteristics of the transducer system electronics, a constant speed, a motion produced by manually moving the read relative to the scale, and a motion occurring during a normal position-determining mode of operation of the transducer system.

31. The method of claim 19, wherein the step of sampling the at least two transducer signals is performed without regard to the relative position between the read head and scale.

32. The method of claim 19, wherein the position transducer generates one of quadrature signals, 3-phase signals, multiple-phase signals from one or more scale tracks, and an arbitrary number of transducer signals that are spaced over 360° of phase.

33. The method of claim 19, wherein the step of correcting at least one signal of the transducer system based on the at least one signal correction value includes correcting the at least one transducer signal for offset and amplitude errors.

34. The method of claim 33, the step of correcting at least one signal of the transducer system based on the at least one signal correction value further comprising determining at least one signal correction value which corrects a phase relation error between at least two of the plurality of transducer signals based on a plurality of transducer signals corrected for offset and amplitude errors.

35. The method of claim 19, further comprising:
inputting a calibration command to initiate the sampling, analyzing and determining steps and subsequently receiving and storing the at least one signal correction value with a memory portion of the transducer system electronics.

* * * * *